Dec. 21, 1965     D. J. FLEMING     3,224,522
VEHICLE SPRING AND AXLE LOADING CONTROL SYSTEM
Filed Oct. 30, 1962     3 Sheets-Sheet 1
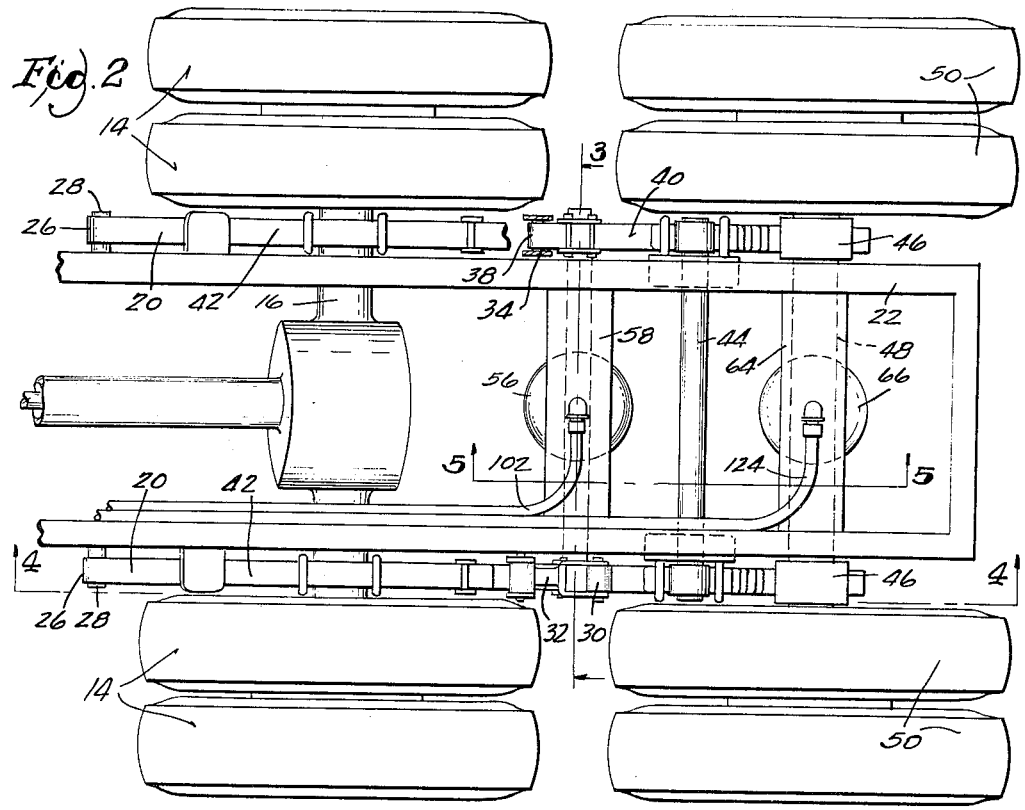
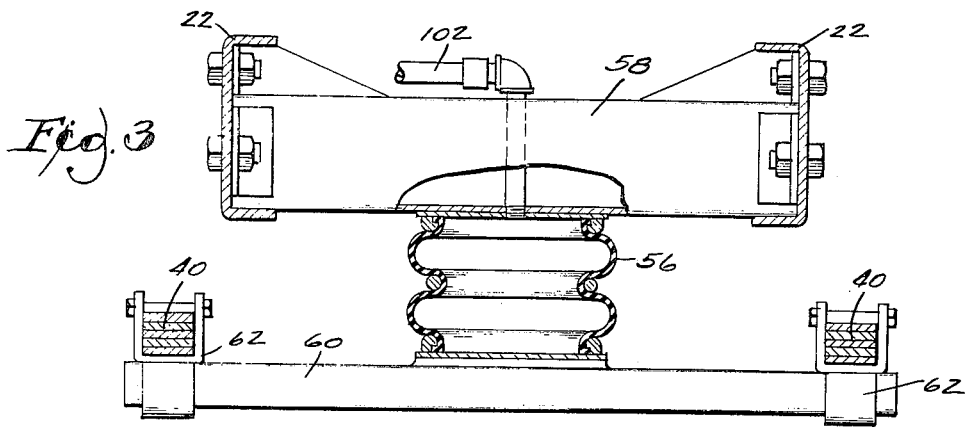
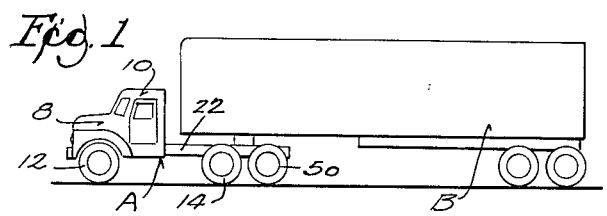
INVENTOR.
DONALD J. FLEMING
BY
Wheeler, Wheeler & Wheeler
ATTORNEYS Dec. 21, 1965  D. J. FLEMING  3,224,522
VEHICLE SPRING AND AXLE LOADING CONTROL SYSTEM
Filed Oct. 30, 1962  3 Sheets-Sheet 2
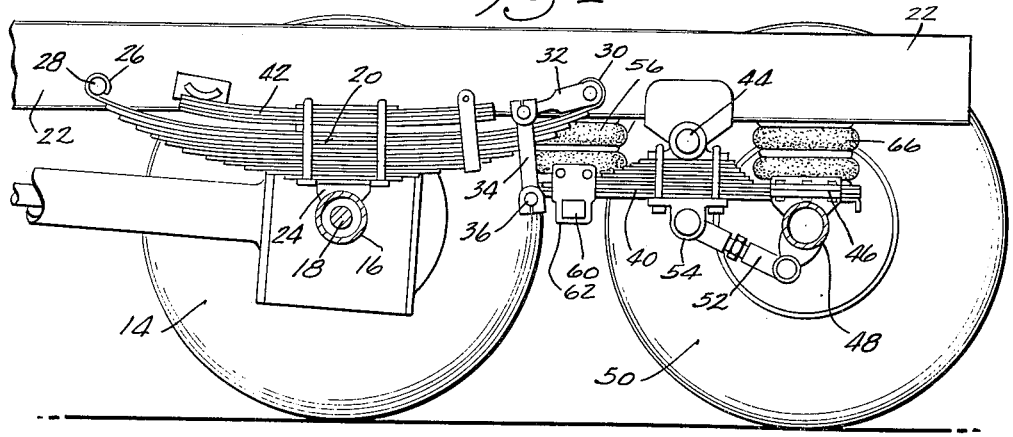
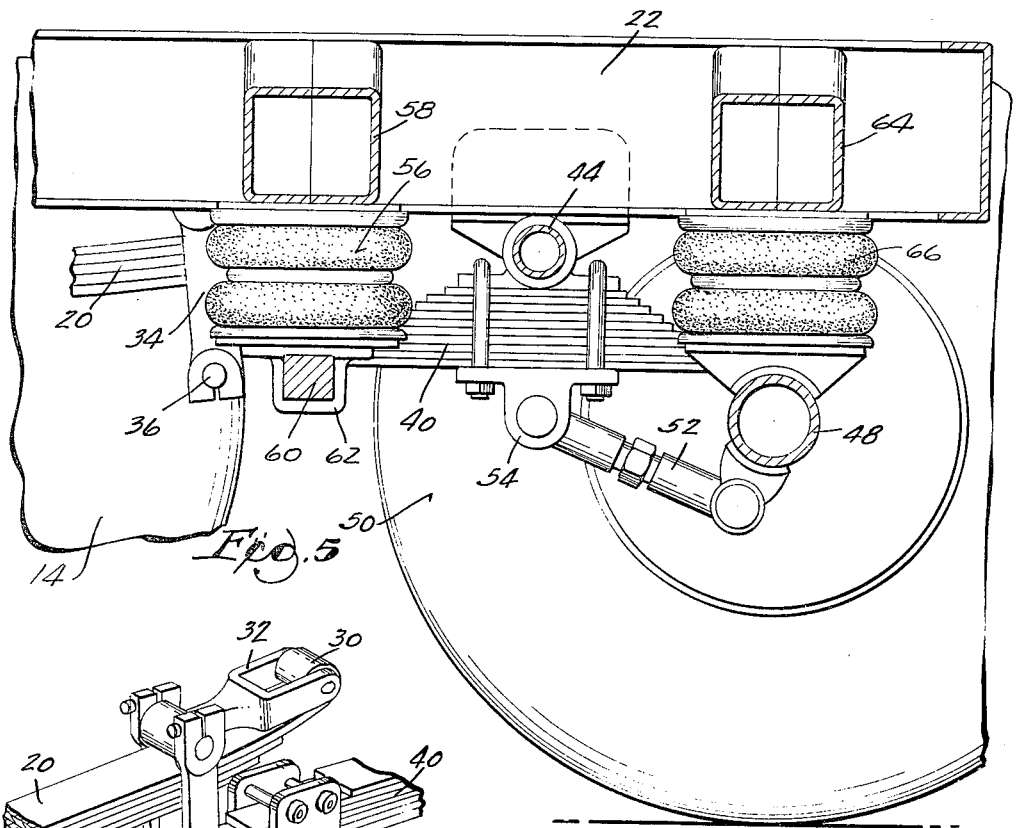
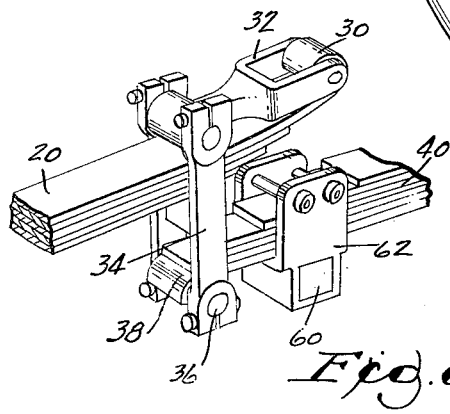
INVENTOR.
DONALD J. FLEMING
BY
Wheeler, Wheeler & Wheeler
ATTORNEYS

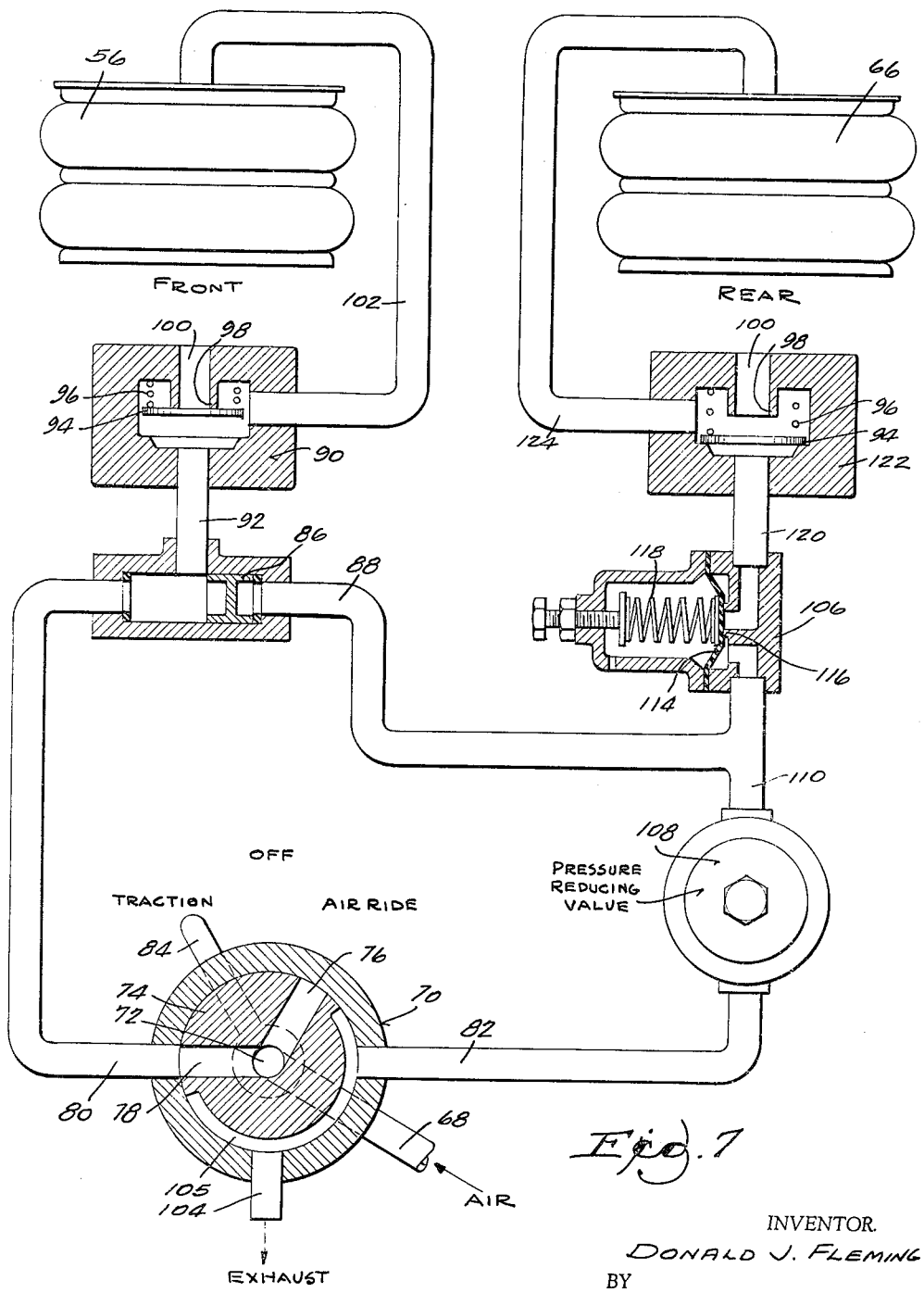

United States Patent Office 3,224,522
Patented Dec. 21, 1965

3,224,522
VEHICLE SPRING AND AXLE LOADING CONTROL SYSTEM
Donald J. Fleming, Green Bay, Wis., assignor to Olson Trailer & Body Builders Co., Green Bay, Wis., a corporation of Wisconsin
Filed Oct. 30, 1962, Ser. No. 234,174
11 Claims. (Cl. 180—22)

This invention relates to a vehicle spring and axle loading control system. One advantageous application of the invention is to the tractor unit of a tractor-trailer combination and it will be described, by way of exemplification, as embodied in such a unit.

By redistributing the payload, it is frequently possible to carry greatly increased payloads while still complying with the varying laws of different states regarding axle loading. Addition of the present invention to an otherwise conventional truck or tractor has permitted the payload to be increased by as much as 14,000 pounds over the amount which might otherwise have been transported legally on the vehicle.

A so-called tag axle separate wheels is added to the vehicle frame behind the drive axle. The tag axle springs are centrally pivoted on brackets connected to the frame, the rear ends of these auxiliary springs bearing on the tag axle and the forward ends thereof being coupled to the rear end of the semi-elliptical springs of the drive axle.

A cross member may connect the forward ends of the auxiliary springs to each other. The rearward ends of the auxiliary springs are already cross-connected by their common attachment to the tag axle. Pneumatic springs of the type commonly known as air bags are arranged to provide variable support for the vehicle frame from the mechanical spring structure both forwardly and rearwardly on the tag axle. If a cross member connects the forward ends of the auxiliary springs as herein disclosed, a single air bag can be applied to the cross member to provide support for the frame from the forward ends of both auxiliary springs. Similarly, a single air bag supporting the rear end of the frame from the tag axle provides auxiliary support connected with the rear ends of both of the auxiliary springs. It will be understood that in referring to a single air bag, it is intended to identify air bag support at a single point, since it is quite common to use air bags stacked in multiples to function as one bag.

A fluid control system which is an important feature of the invention enables the operator to control at will the relative inflation of the respective air bags. In practice, a single control valve is provided in the operator's cab. By simply switching the valve lever from one position to another, the operator can provide the air spring between the frame and the front ends of the auxiliary springs with upwards of 100 pounds of pressure for maximum traction or with an intemediate pressure (fixed for exemplification at 28 pounds to give "air ride") or with zero pressure. It will be understood that the figures given are by way of example and not by way of limitation.

Similarly, the same single lever will shift the pressure in the rear air spring between the frame and the tag axle from a minimum of 8 pounds when the drive axle is loaded for traction, through an intermediate pressure of 28 pounds for the condition described as "air ride" to a minimum of 8 pounds when the front air spring means has zero pressure. Again, the figures are by way of exemplification only. The actual pressures may be changed by varying the springs to which some of the valves are subject, it being the intention that these be pre-set and that the single valve control lever available to the operator in his cab will simply make a selection between the various pre-set pressures.

When the valve is set to give maximum traction, as much of the load as is possible is imposed on the drive axle regardless of legal wheel loading requirements. The tag axle may actually be lifted from the pavement if desired. However, it has been found desirable to keep certain minimum pressures on the tag axle to eliminate bouncing and to give smoother ride.

In the intermediate or "off" position of the lever, the pressure from the air supply is completely cut off from the air springs. This promptly reduces the pressure on the forward air spring to zero but the rear air spring retains a pre-set pressure which, for purposes of this example, is still to be 8 pounds.

Particularly when the vehicle carries no payload (as, for example, when a tractor has no trailer attached) it becomes very desirable to divide the vehicle frame load between the drive axle and the tag axle and to provide a considerable measure of pneumatic springing under these conditions. In the given example, both axles have their air springs subject to 28 pounds of pressure. It is found that with this arrangement the vehicle rides almost as easily as a pleasure car.

In the drawings:
FIG. 1 is a small scale view in side elevation of a tractor-trailer combination of the type to which this invention is particularly adapted.
FIG. 2 is a fragmentary plan view on an enlarged scale of the rear end of a truck frame equipped with this invention.
FIG. 3 is a view on a further enlarged scale taken in section on the line 3—3 of FIG. 2.
FIG. 4 is a view taken on the line 4—4 of FIG. 2, being a side elevation with the wheels removed and the axles in section.
FIG. 5 is a fragmentary enlarged view taken in section on the line 5—5 of FIG. 2.
FIG. 6 is a fragmentary detail view in perspective showing the yoke connecting the rear ends of a main spring with the forward end of an auxiliary spring.
FIG. 7 is a diagrammatic view of the fluid control circuit.

It is again desired to emphasize that the invention is applicable to vehicles of many types, the selected embodiment disclosing the tractor of a tractor-trailer combination for exemplification only. The tractor is shown at A in FIG. 1 and the trailer at B. Since the description is limited to the tractor, the payload represents such load as is imposed on the tractor by the forward end of the trailer B.

The tractor includes the usual engine hood 8, cab 10, steering wheels 12 and driving wheels 14. The latter are conventionally mounted on the axle 16 which is herein referred to as a drive axle. It comprises a housing for the internal live axle 18 (FIG. 4) which drives the wheels 14 upon which the drive axle housing 16 is supported.

The springs 20 at opposite sides of frame 22 may be centered on the pads 24 of the drive axle 16 if the springs are semi-elliptical springs as shown. At their forward ends, the spring eyes 26 have pivotal connection at 28 with the frame 22. At the rear ends of these springs, the connection to the frame is eliminated for the purposes of the present invention. Instead, each spring eye 30 (FIG. 6) is connected by a link 32 with a yoke 34 through which the spring 20 passes and which is provided with a pintle 36 engaged in the eye 38 of the auxiliary spring 40 as best shown in FIGS. 4 and 6. Each main spring 20 may be reinforced by a supplemental spring 42 but this is optional and plays no part in the present invention.

There is also one of the auxiliary springs 40 at each side of the frame 22. Each auxiliary spring is centrally pivoted on a cross bar 44 of the frame. The rear ends of the auxiliary springs 40 pass through bearing boxes 46 on the tag axle 48, upon which the tag axle wheels 50 are suitably journaled. A link 52 pivotally connects the tag axle to the mounting yoke 54 for each auxiliary spring 40, thereby keeping the tag axle from rotation.

Pneumatic spring means 56 supports the frame 22 from the spring system including coupled springs 20 and 40. The pneumatic spring 56 is illustrated as comprising a single set of superimposed bags which function as one, being in communication with each other as shown in FIG. 3. Instead of having separate resilient spring means at each side of the frame 22, it is preferred to locate the forward pneumatic spring means 56 centrally of the frame in a position where it is confined between the cross member 58 of the frame and a cross member 60 which has its ends connected with the respective spring systems, as by means of the mounting fittings shown at 62 in FIGS. 4, 5 and 6.

The frame is also provided with a cross member 64 directly over the tag axle 48 so that another pneumatic spring 66 engaged centrally of the frame between the tag axle and cross member 64 eliminates any need for having separate pneumatic spring means at both sides of the vehicle. Again, two superimposed bags functioning as one are employed, this being preferred to the larger diameter of bag which would otherwise be necessary.

Air is supplied to the pneumatic spring means from a suitable source (not shown) through a pressure supply line 68 which leads to a valve 70 normally located in the cab. In practice, a compressor delivers through pipe 68 air under line pressure of 100 to 110 pounds per square inch. The inlet pipe 68 communicates with a central bore 72 of valve plug 74 from which the generally radial passages 76 and 78 may be registered selectively with pipes 80 and 82, respectively, leading toward the front and rear air springs 56 and 66. As shown in FIG. 7, the valve plug 74 has been rotated by handle 84 to a position in which maximum traction is provided.

To impose most of the load on the housing 16 of the driving axle, the high pressure air which traverses pipe 80 in the position of the parts shown in FIG. 7 has forced the two-way check valve 86 to its extreme right-hand position, thereby shutting off pipe 88 and opening communication from pipe 80 to quick release valve 90 through pipe 92. As long as air under pressure in excess of that of spring 96 is being received into the valve 90 through pipe 92, the valve 94 will be held to its seat 98 against the bias of spring 96. This will retain air under pressure in air spring 56, which communicates with valve 90 through pipe 102. However, if pipe 92 is relieved of pressure, as happens when the manually controlled valve plug 74 is shifted to its "off" position, then valve 94 immediately opens to vent through port 100 all pressure from the front pneumatic spring means 56.

If the manually controlled valve plug 74 is moved clockwise from the position of FIG. 7 to a position in which the handle 84 extends upwardly toward the legend "off," the high pressure line 68 is disconnected from pipe 80 and pipe 80 is placed in communication with the exhaust pipe 104 by means of a channel 105 in the valve plug. In the position of the parts shown in FIG. 7, this channel is exhausting air from pipe 82 and from the rear air spring means 66 (except in so far as a certain amount of pressure is maintained in the rear air spring means by a pressure hold-back valve 106 hereinafter described).

If the valve lever 84 is moved further clockwise to register with the legend "air ride," the exhaust channel 105 will continue to provide communication between pipe 80 and exhaust pipe 104 but the channel will now move out of registry with pipe 82. Instead, the high pressure duct 76 will now register with channel 82, delivering line pressure through pipe 82 to a reducing valve 108 which is conventional and is set, as a matter of optional preference, to deliver 28 pounds to the outlet pipe 110. A branch of this pipe is provided at 88 leading to the aforesaid double check valve. When pressure is supplied through the reducing valve from pipe 82 to pipe 88, the check valve 86 moves across center to place pipe 88 in communication with pipe 92 and thence through the quick release valve 90 to the forward air spring 56 which is now at 28 pound pressure instead of line pressure of 100 pounds plus.

At the same time, the pressure communicated from the reducing valve 108 to the pressure hold-back valve 106 acts on the diaphragm 114 to displace this from its seat 116 against the bias of the adjustable spring 118. This admits the air under 28 pound pressure into the pipe 120 leading to the quick release valve 122, this being identical with the valve 90, and used for the same purpose. The air pressure so admitted will displace the valve disk 94 against the bias of spring 96 to engage seat 98 thereby shutting off the exhaust port 100. This enables the air at 28 pound pressure to be communicated through the pipe 124 (see FIG. 2) to the rear air spring means 66. In this position of the manually operable control valve plug 74, both the forward and the rear air spring means 56 and 66, respectively, will be subject to 28 pounds pressure, this being the arbitrarily selected pressure for which the reducing valve 100 is set.

If the manually rotatable valve plug 74 is now rotated back to its "off" position, line pressure will be released through channel 105 from pipe 82. This will permit the quick release valve 122 to open but this valve will re-close as soon as the diaphragm 114 of hold-back valve 106 re-seats under the bias of spring 118. This happens when the arbitrarily selected preferred value of 8 pounds minimum pressure is reached. Thus the pressure in the rear air spring means 66 will never fall below 8 pounds in the instant embodiment of the invention, although the pressure in the front rear spring means 56 will be at zero in the "off" position of the control valve.

By predetermining relative loads by means of the several valves 108, 106, 98, 122, it is possible to take care of all conditions whether the tires used on either axle are single or dual and regardless of the payload required to be distributed between the axles.

Moreover, notwithstanding that proper distribution can be had under normal load handling conditions, it is possible for the operator immediately to throw substantially the entire load onto the drive axle and its tires when traction needs so require.

Except for the pressure hold-back of the valve 106 in the pneumatic system, the leverage of the several vehicle springs subjected to 28 pounds pressure exerted on the forward pneumatic spring means 56 would, without load, lift the tag axle and its wheels from the pavement. By maintaining a predetermined amount of pressure on the tag axle, the operator is not only given a much smoother ride but the equipment is protected from a great deal of vibration and resulting wear which has heretofore been experienced in vehicles having tag axles.

I claim:
1. In a vehicle having a drive axle and a tag axle, wheels on both axles, and a frame above said axles; the combination with said axles, of a spring system supporting the frame and including at each side of the frame a first spring having a connection at its front end with the frame and having a connection intermediate its ends with the drive axle, and a second spring having a connection at its front end with the rear end of the first spring and having a pivotal connection intermediate its ends with the frame and having a connection at its rear end with the tag axle; first and second air springs for which the frame is pro- vided with seats respectively forwardly of the said pivotal connection and rearwardly thereof, means for imposing first air spring thrust on the connected ends of the first and second springs, and means for imposing second air spring thrust on the tag axle.

2. A vehicle according to claim 1 including supply means for supplying air under pressure to said air springs and remote valve means for varying the relative pressure at which air from said supply means is maintained in respective air springs.

3. A vehicle according to claim 2 in which the means for varying relative pressure includes means for maintaining predetermined minimum pressure on the second air spring.

4. In a vehicle having a drive axle and a tag axle, wheels on both axles, and a frame above said axles; the combination with said axles, of a spring system supporting the frame and including at each side of the frame a first spring having a connection at its front end with the frame and having a connection intermediate its ends with the drive axle, and a second spring having a connection at its front end with the rear end of the first spring and having a pivotal connection intermediate its ends with the frame and having a connection at its rear end with the tag axle; first and second air springs for which the frame is provided with seats respectively forwardly of the said pivotal connection and rearwardly thereof, means for imposing first air spring thrust on the connected ends of the first and second springs, and means for imposing second air spring thrust on the tag axle, means for supplying air under pressure to said air springs, means including remote valve means for varying the relative pressure at which air from said supply means is maintained in respective air springs, said last means including means for maintaining a predetermined minimum pressure on the second air spring, the means for varying relative pressure including a source of air under line pressure, a control valve having a plurality of air discharge ports, one of which constitutes a vent, connections from other discharge ports of said valve to the respective air spring and air spring means, one of said connections including means for delivering line pressure of said source to the air spring means independently of the first mentioned air spring, and the other of said connections including means comprising a pressure reducing valve for delivering air under reduced pressure to both of said air spring and said air spring means.

5. The combination with a vehicle having a drive axle and a tag axle, both provided with wheels, and a frame above said axles, and means defining a driver's station and mounted on said frame, of spring means at both sides of the frame for supporting the frame from both axles, a front air spring means for increasing the relative support of the frame from the drive axle, a rear air spring means for increasing the support of the frame from the tag axle, and remote control pressurizing and venting means at said driver's station and including a valve having a high pressure source of air and piping from said valve to said front and rear air spring means for varying the relative pressure in the air spring means whereby to vary the support contributed to the frame by the respective axles.

6. A combination according to claim 5 in which the spring means includes series-connected springs at each side of the frame including a first spring connected intermediate its ends with the drive axle and having a forward end connection with the frame, a second spring connected intermediate its ends with the frame and having a forward connection with the rear end of the first mentioned spring and having a rear end connection with the tag axle.

7. A combination according to claim 6 in which a cross member extends transversely beneath the frame and is connected with the forward ends of the said second springs at opposite sides of the frame, the frame having a spring seat overlying said cross member and the front air spring means being mounted on said cross member and engaged with said spring seat, the rear air spring means being interposed between the tag axle and the frame.

8. The combination with a vehicle having a drive axle and a tag axle, both provided with wheels, and a frame above said axles, and means defining a driver's station and mounted on said frame, of spring means at both sides of the frame for supporting the frame from both axles, a front air spring means for increasing the relative support of the frame from the drive axle, a rear air spring means for increasing the support of the frame from the tag axle, and remote control pressurizing and venting means at said driver's station and including a valve having a high pressure source of air and piping from said valve to said front and rear air spring means for varying the relative pressure in the air spring means whereby to vary the support contributed to the frame by the respective axles, the spring means including series-connected springs at each side of the frame including a first spring connected intermediate its ends with the drive axle and having a forward end connection with the frame, a second spring connected intermediate its ends with the frame and having a forward connection with the rear end of the first mentioned spring and having a rear end connection with the tag axle, the frame including a cross member extending transversely and with which the forward ends of the second springs are connected at opposite sides of the frame, the frame having a spring seat overlying said cross member and the front air spring means being mounted on said cross member and engaged with said spring seat, the rear air spring means being interposed between the tag axle and the frame, said valve and piping including means for selectively reducing pressure in one of said air spring means while maintaining a predetermined pressure in the other.

9. The combination with a vehicle having a drive axle and a tag axle, both provided with wheels, and a frame above said axles, and means defining a driver's station and mounted on said frame, of spring means at both sides of the frame for supporting the frame from both axles, a front air spring means for increasing the relative support of the frame from the drive axle, a rear air spring means for increasing the support of the frame from the tag axle, and remote control pressurizing and venting means at said driver's station and including a valve having a high pressure source of air and piping from said valve to said front and rear air spring means for varying the relative pressure in the air spring means whereby to vary the support contributed to the frame by the respective axles, said remote control means including a first line extending from said valve to said front air spring means for placing said high pressure source directly in communication with said front air spring means, and a second line extending from said valve to said rear air spring means and including a pressure reducer, and a cross connecting line beyond said pressure reducer to the first mentioned line leading to said front air spring means.

10. The combination with a vehicle having a drive axle and a tag axle, both provided with wheels, and a frame above said axles, and means defining a driver's station and mounted on said frame, of spring means at both sides of the frame for supporting the frame from both axles, a front air spring means for increasing the relative support of the frame from the drive axle, a rear air spring means for increasing the support of the frame from the tag axle, and remote control pressurizing and venting means at said driver's station and including a valve having a high pressure source of air and piping from said valve to said front and rear air spring means for varying the relative pressure in the air spring means whereby to vary the support contributed to the frame by the respective axles, said remote control means including a first line extending from said valve to said front air spring means for placing said high pressure source directly in communication with said front air spring means, and a second line extending from said valve to said rear air spring means and including a pressure reducer, and a cross connecting line beyond said pressure reducer between the second line and the first mentioned line, said remote control means further including means for venting pressure from one air spring means while retaining a predetermined minimum pressure on the other air spring means.

11. The combination with a vehicle having a drive axle and a tag axle, both provided with wheels, and a frame above said axles, and means defining a driver's station and mounted on said frame, of spring means at both sides of the frame for supporting the frame from both axles, a front air spring means for increasing the relative support of the frame from the drive axle, a rear air spring means for increasing the support of the frame from the tag axle, and remote control pressurizing and venting means at said driver's station and including a valve having a high pressure source of air and piping from said valve to said front and rear air spring means for varying the relative pressure in the air spring means whereby to vary the support contributed to the frame by the respective axles, said remote control means including a first line extending from said valve to said front air spring means for placing said high pressure source directly in communication with said front air spring means, and a second line extending from said valve to said rear air spring means and including a pressure reducer, and a cross connecting line beyond said pressure reducer to the first mentioned line leading to said front air spring means, said remote control means further including means for venting pressure from one air spring means while retaining a predetermined minimum pressure on the other air spring means, the means for venting pressure from one said spring means while retaining a predetermined minimum pressure on the other air spring means including a normally open relief valve connected with said one spring means and having a valve closing piston exposed to pressure in the first line and in the cross connecting line toward said one air spring means, the second such line further including a check valve biased to close when said predetermined minimum pressure in the other spring means has been reached.

References Cited by the Examiner
UNITED STATES PATENTS 2,919,757  1/1960  Bonnin _____ 180—22
2,934,351  4/1960  Masser _____ 180—22

FOREIGN PATENTS 1,238,682  7/1960  France.
1,242,573  8/1960  France.

OTHER REFERENCES

Commercial Car Journal Article, October, page 85.

BENJAMIN HERSH, *Primary Examiner.*

A. HARRY LEVY, *Examiner.*